Figure 1:
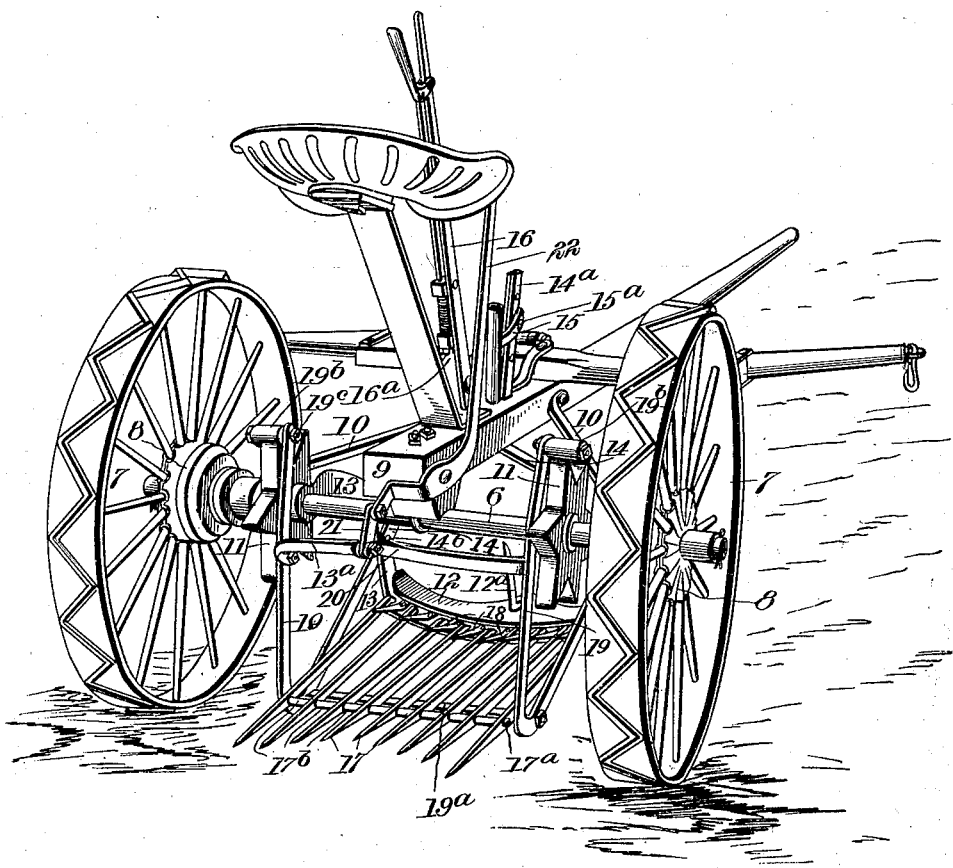

No. 726,549. PATENTED APR. 28, 1903.
F. G. LILLY.
POTATO DIGGER.
APPLICATION FILED JUNE 2, 1902.
NO MODEL. 2 SHEETS—SHEET 1.

Witnesses
C. H. Walker,
Geo. E. Tew.

Inventor
Francis G. Lilly
By Milo B. Stevens & Co.
Attorneys

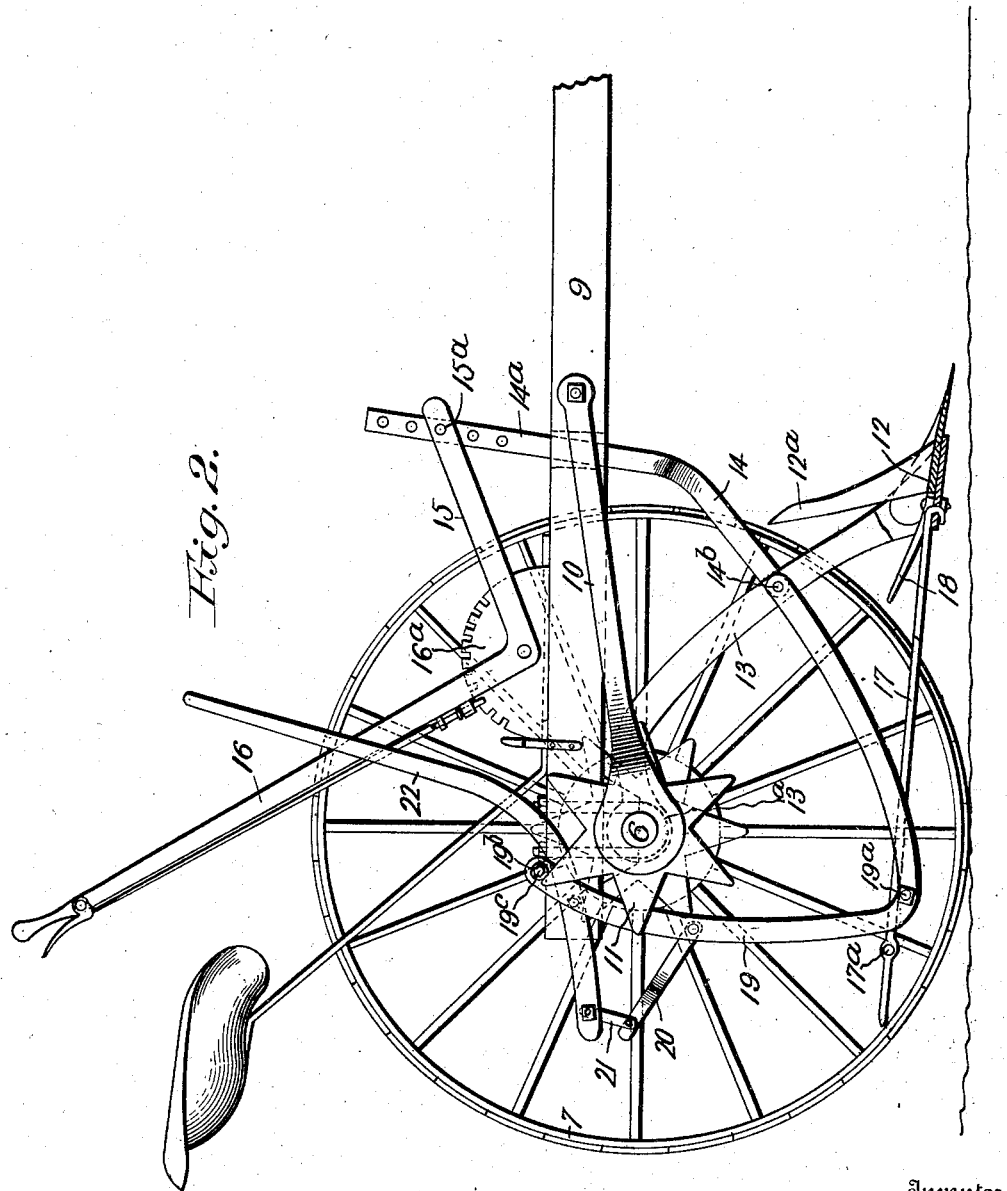

UNITED STATES PATENT OFFICE.

FRANCIS G. LILLY, OF PADANARAM, OHIO, ASSIGNOR OF ONE-HALF TO S. E. CLARK, OF PADANARAM, OHIO.

POTATO-DIGGER.

SPECIFICATION forming part of Letters Patent No. 726,549, dated April 28, 1903.

Application filed June 2, 1902. Serial No. 109,880. (No model.)

*To all whom it may concern:*

Be it known that I, FRANCIS G. LILLY, a citizen of the United States, residing at Padanaram, in the county of Ashtabula and State of Ohio, have invented certain new and useful Improvements in Potato-Diggers; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to potato-diggers, and particularly to those having a vibrating screen behind the shovel.

The object of the invention is to generally simplify and improve the construction of such diggers.

A further object is to provide improved means for supporting and shaking the vibratory screen.

A further object is to form improved supporting and adjusting means for the shovel.

With these and other objects in view the invention is hereinafter described and is illustrated in the accompanying drawings, in which—

Figure 1 is a rear perspective view of the machine. Fig. 2 is a side elevation with the near wheel removed.

Referring specifically to the drawings, 6 indicates the revoluble axle of the machine, supported on wheels 7, which are provided with ratchet-hubs 8, so that when the machine is backed the shaker will not operate.

The rear end of the tongue 9 is supported by a proper bearing-box on the axle and is stiffened by side braces 10, the front ends of which are bolted to the tongue and the rear ends of which are provided with eyes through which the axle extends.

The star-cams 11 are keyed to the axle and operate the vibrating screen, as hereinafter described.

The hanging supporting-frame for the shovel 12 is indicated at 13, the ends of the arms thereof having eyes 13ᵃ, through which the axle extends. From the axle the frame is extended downwardly and forwardly and is curved in proper form to receive and support the shovel 12, which is fixed thereto. The colter 12ᵃ is attached to the point of the shovel for an obvious purpose.

The branches 14 and stem 14ᵃ form a yoke for raising, lowering, and adjusting the depth of the shovel. The lower ends of the branches are pivoted to the frame 13 at 14ᵇ, and the stem of the yoke extends through a slot in the tongue and is connected above the tongue by an arm 15 to the lifting-lever 16, which is pivoted to the segment-rack bracket 16ᵃ and has a common spring-latch to engage the teeth of the rack. The stem of the yoke has a series of holes to permit adjustment with the connecting-arm 15 by bolt 15ᵃ. Appropriate movement of the lever will raise or lower the shovel-supporting frame, as desired.

The frame 13 behind the shovel is drilled to receive the hooked forward ends of the separator-rods 17, which work loosely therein. Between the rods short upwardly-inclined teeth 18 are bolted to the frame to assist the screening action. The rear ends of the rods 17 are somewhat loosely connected by a cross-rod 17ᵃ, which extends through holes in the rods and is provided with sleeves 17ᵇ to properly space the rods. A loose motion is thus allowed, which assists the separating operation in connection with the vibrating mechanism now to be described.

At each side of the separating-screen bent levers 19 are pivoted at their forward ends to the frame 13, conveniently by the pivot 14ᵇ, heretofore mentioned. At or near the elbows of the levers is a cross-bar 19ᵃ, joining the levers and supporting the separator-rods. Thence the levers extend in a substantially vertical direction beside the cam-wheels 11, and at the top the levers have friction-rolls 19ᵇ on pins 19ᶜ to strike the points of the cams. The cams are set on the axle a half-point ahead of each other, so that the opposite levers are operated alternately, which has the effect of giving the screen a rocking motion in addition to the vertical motion, whereby the matter on the screen is given a compound shaking movement, which effectively accomplishes the purpose of the apparatus.

The upper ends of the levers are spaced and supported by a yoke 20, to which is connected, by link 21, a hand-lever 22, which is pivoted to the rear end of the tongue, whereby the separator may be lifted out of engagement with the cams when desired. The branches of the yoke are separate and pivoted to the link and levers, so as to permit the opposite motion on each side.

Having thus described the invention, what I claim as new, and desire to secure by Letters Patent, is—

1. In a potato-digger, the combination with a wheeled axle, and a shovel-frame supported thereby, of a vibratory screen behind the shovel, bent levers on opposite sides of the screen, a supporting-bar under the screen attached to the elbows of the levers, and axle-driven means to alternately actuate the levers to rock the screen laterally and shake it vertically.

2. In a potato-digger, the combination with a wheeled axle and a shovel-frame hung therefrom, of a vibratory screen behind the shovel comprising rods loosely joined to the shovel, bent levers on each side of the screen having their forward ends pivoted to the shovel-frame, a supporting-bar under the screen connecting the elbows of the levers, and axle-driven means alternately actuating the levers to shake the rods.

In testimony whereof I affix my signature in presence of two witnesses.

FRANCIS G. LILLY.

Witnesses:
OSCAR L. SPRAGUE,
E. P. MERRITT.